United States Patent
Fu et al.

(10) Patent No.: US 10,793,765 B2
(45) Date of Patent: Oct. 6, 2020

(54) SHALE STABILIZATION FLUIDS

(71) Applicant: SCHLUMBERGER TECHNOLOGY CORPORATION, Sugar Land, TX (US)

(72) Inventors: Diankui Fu, Kuala Lumpur (MY); Daniel Kalinin, Chapel Hill (AU); Soo Hui Goh, Kuala Lumpur (MY); Kong Teng Ling, Puchong (MY)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 16/303,037

(22) PCT Filed: May 19, 2016

(86) PCT No.: PCT/MY2016/000030
§ 371 (c)(1),
(2) Date: Nov. 19, 2018

(87) PCT Pub. No.: WO2017/200373
PCT Pub. Date: Nov. 23, 2017

(65) Prior Publication Data
US 2019/0316023 A1      Oct. 17, 2019

(51) Int. Cl.
| | | |
|---|---|---|
| *C09K 8/506* | (2006.01) | |
| *E21B 33/138* | (2006.01) | |
| *E21B 43/22* | (2006.01) | |
| *E21B 37/06* | (2006.01) | |
| *C09K 8/504* | (2006.01) | |

(52) U.S. Cl.
CPC ............ *C09K 8/506* (2013.01); *C09K 8/5045* (2013.01); *E21B 33/138* (2013.01)

(58) Field of Classification Search
CPC .......... C09K 8/035; C09K 8/467; C09K 8/52; C09K 8/887; C09K 8/62; C09K 8/64; C09K 8/725; C09K 2208/26; C09K 8/68; C09K 8/685; E21B 43/26; E21B 43/16; E21B 21/003; E21B 43/267; E21B 21/00; E21B 43/25; E21B 21/062; E21B 33/14; E21B 37/06; E21B 33/13; E21B 33/138; E21B 37/00
See application file for complete search history.

(56) References Cited

U.S. PATENT DOCUMENTS

| | | |
|---|---|---|
| 7,740,068 B2 | 6/2010 | Ballard |
| 2007/0029087 A1 | 2/2007 | Nguyen et al. |
| 2010/0258313 A1 | 10/2010 | Ballard |
| 2016/0090525 A1 | 3/2016 | McDonald et al. |

FOREIGN PATENT DOCUMENTS

| | | |
|---|---|---|
| WO | 2014102388 A2 | 7/2014 |
| WO | 2016070044 A1 | 5/2016 |

OTHER PUBLICATIONS

International Search Report and Written Opinion issued in International Patent Appl. No. PCT/MY2016/000030 dated Jan. 13, 2017; 12 pages.

*Primary Examiner* — Zakiya W Bates
(74) *Attorney, Agent, or Firm* — Rodney Warfford

(57) ABSTRACT

A method for treating a subterranean formation containing shale includes introducing to the subterranean formation a shale stabilizer, a surfactant, and a triggering agent simultaneously with or prior to introducing an alkali silicate to the subterranean formation, and allowing the alkali silicate and triggering agent to react to form a reaction product. Methods include coating the surface of at least a portion of the shale with the reaction product.

20 Claims, 14 Drawing Sheets

SHALE STABILIZATION FLUIDS

RELATED APPLICATION DATA

None.

FIELD

The disclosure generally relates to aqueous solutions and methods of using such in treating subterranean formations. The disclosure also relates to aqueous solutions including silicate-based additives for stabilizing shale formations.

BACKGROUND

The statements in this section merely provide background information related to the present disclosure and may not constitute prior art.

Shale is composed of a mix of clay minerals and other minerals such as quartz and calcite. Oil and gas produced from shale formations have seen a dramatic increase over the last decade. Drilling of shale formations can be problematic due to its instability in aqueous fluids. Although various materials have been added to drilling fluids to ensure shale integrity during drilling, their effectiveness is only temporary. In some cases, costly oil based mud (OBM) is used to provide the needed stability. In places like Australia, many coalbed methane (also referred to as coal seam gas—CSG, but hereinafter referred to as "CBM") wells have been completed openhole with a pre-perforated liner. In such a system, there is no isolation between the coalbed and the inter-burden layer which is shale, sandtone, siltstone or mudstone containing water sensitive clay minerals. CBM formations normally produce formation water first to depressurize the formation so that adsorbed gas can be produced months later. The inter-burden shale layer, when exposed to formation water, can collapse causing issues with well stability and fines production. Fines produced can cause operational issues with surface and downhole equipment such as posivive cavity pumps (PCP) or electric submersible pumps (ESP). Workover to remedy those issues is both costly and time consuming. It is therefore highly desirable that a method be developed to permanently stabilize the shale layer.

SUMMARY

A method for treating a subterranean formation includes:
a) introducing an aqueous solution comprising i) water, ii) a shale stabilizer, iii) a surfactant, and iv) a triggering agent into the subterranean formation, wherein the subterranean formation comprises shale and is fluidly coupled to a wellbore;
b) introducing an alkali silicate into the subterranean formation; and
c) allowing the alkali silicate and the triggering agent to react to form a reaction product selected from the group consisting of a silicate gel, an insoluble silicate salt, and combinations thereof.

A method for stabilizing a subterranean formation includes:
a) introducing an aqueous solution comprising i) water, ii) a shale stabilizer, iii) a surfactant, and iv) a triggering agent into the subterranean formation, wherein the subterranean formation comprises shale and is fluidly coupled to a wellbore;
b) introducing an alkali silicate into the subterranean formation;
c) allowing the alkali silicate and the triggering agent to react to form a reaction product selected from the group consisting of a silicate gel, an insoluble silicate salt, and combinations thereof;
d) introducing a conditioning stream comprising water into the subterranean formation;
e) introducing a subsequent aqueous solution comprising i) water, ii) a subsequent shale stabilizer, and iii) a subsequent triggering agent into the subterranean formation;
f) introducing a subsequent alkali silicate into the subterranean formation; and
g) allowing the subsequent alkali silicate and the subsequent triggering agent to react to form a subsequent reaction product selected from the group consisting of a silicate gel, an insoluble silicate salt, and combinations thereof.

A method for providing stability to a subterranean formation includes:
a) introducing a first stream containing a shale stabilizer and a first surfactant into the subterranean formation, wherein the subterranean formation contains shale and is fluidly coupled to a wellbore;
b) introducing a second stream containing an alkali silicate and a second surfactant into the subterranean formation;
c) introducing a third stream containing a triggering agent into the subterranean formation; and
d) allowing the alkali silicate and the triggering agent to react to form a reaction product selected from the group consisting of a silicate gel, an insoluble silicate salt, and combinations thereof.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

Figure 1:
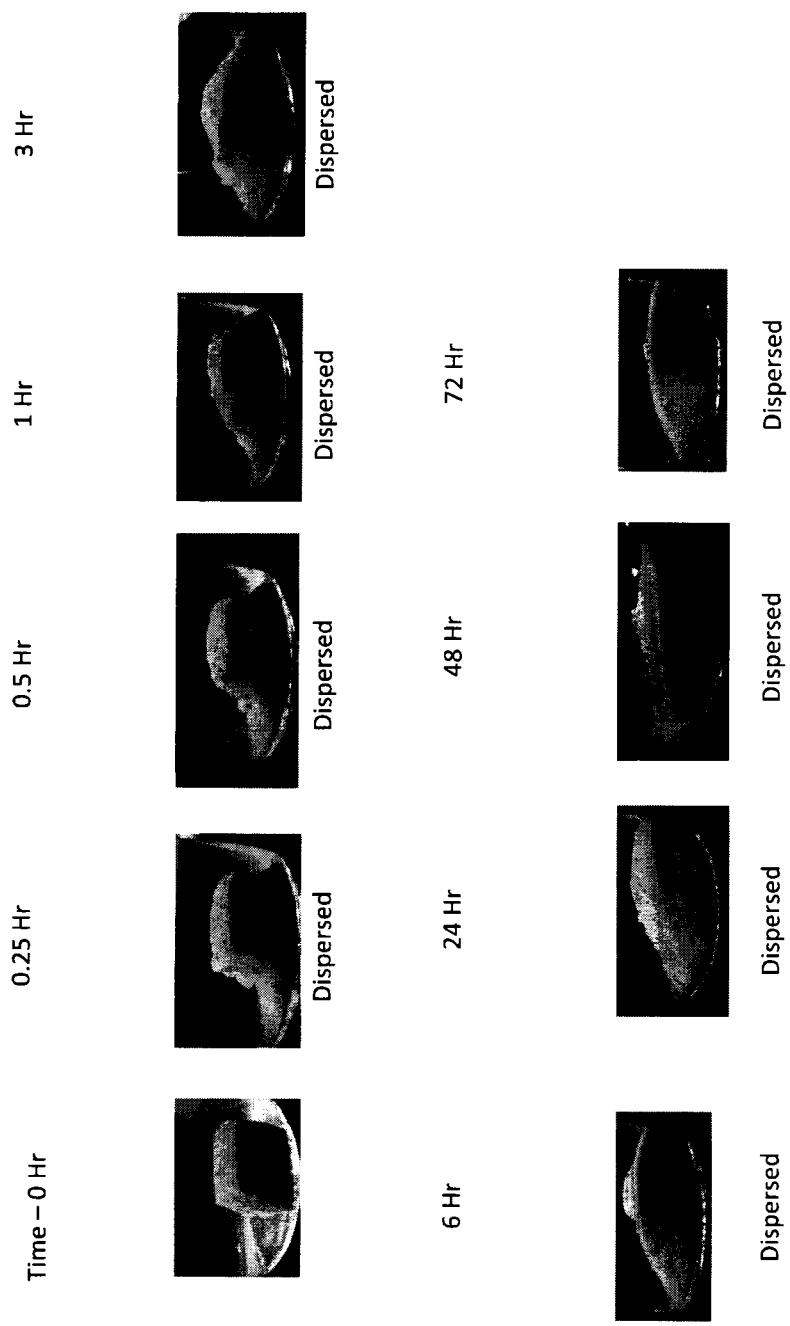
FIG. 1 depicts photographs of shale samples following various treatment exposures.

Subterraneous formation exhibiting sensitivity to water may be exposed to the sequence of fluids discussed hereunder using, but not limited to, any one of following methods or combinations thereof:
a. Using continuous or jointed tubular string and straddled isolation elements to force fluids out of pre-perforated, slotted liner or screens into an openhole section. The distance between sealing elements and separately the pumping rate could be selected to force the fluid to exit liner perforations evenly and provide sufficient velocity to expose subterranean formations to the fluid.
b. Using a production or workover string or a coil tubing extending to the bottom of the screen. The difference in density between the well fluid or gas and the fluid introduced to the subterranean formation could force the latter to exit a pre-perforated liner into an openhole section filling it from the bottom up. Subsequent fluids with lower densities could be pumped or otherwise introduced to the subterranean formation down the tubing annulus.
c. The tubing may be equipped with a downhole pump, such as a PCP, sucker rod pump or ESP. Said pump may be turned on to produce the fluid earlier introduced to the subterranean formation and maintain a desired level of downhole pressure to prevent fluid loss into a depleted strata.
d. Deviated or sub vertical wells could be treated via injecting fluids via the annulus of the installed tubing string. Gravity may force the fluid to exit pre-perforated liners and expose the lower side or the entire wellbore to the fluid.
e. Depleted wells in a subterranean formation could be pre-conditioned with fluid loss or loss circulation material to prevent the fluids described herein from entering into a permeable strata.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the compositions used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that the Applicant appreciates and understands that any and all data points within the range are to be considered to have been specified, and that the Applicant possessed knowledge of the entire range and all points within the range.

The term formation as utilized herein should be understood broadly. A formation includes any underground fluidly porous formation, and can include without limitation any oil, gas, CBM, condensate, mixed hydrocarbons, paraffin, kerogen, water, and/or $CO_2$ accepting or providing formations. A formation can be fluidly coupled to a wellbore, which may be an injector well, a producer well, and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

A method for treating a subterranean formation can comprise, consist of, or consist essentially of:
a) introducing an aqueous solution comprising i) water, ii) a shale stabilizer, iii) a surfactant, and iv) a triggering agent into the subterranean formation, wherein the subterranean formation comprises shale and is fluidly coupled to a wellbore;
b) introducing an alkali silicate into the subterranean formation; and
c) allowing the alkali silicate and the triggering agent to react to form a reaction product selected from the group consisting of a silicate gel, an insoluble silicate salt, and combinations thereof.

The aqueous solution is allowed to contact at least a portion of the shale in the subterranean formation for at least about 10 minutes and up to about 3 days or at least about 30 minutes and up to about 24 hours or at least about 1.5 hours and up to about 12 hours prior to introduction of the of the alkali silicate.

The reaction product can form a coating on the surface of at least a portion of the shale. The subterranean formation can be a coal bed methane formation comprising at least two coal bed seams and at least one shale inter-burden comprising shale located between the coal bed seams.

The alkali silicate as referred to throughout this application can be selected from the group consisting of sodium silicate, potassium silicate, and combinations thereof. The shale stabilizer as referred to throughout this application can be selected from the group consisting of a polyether amine, a polyether amine salt, potassium chloride, choline chloride, tetramethylammonium chloride, and combinations thereof.

The surfactant referred to throughout this application can be selected from the group consisting of: nonionic surfactants, anionic surfactants, zwitterionic surfactants, and combinations thereof. It is believed that the surfactant aids in controlling the thickness of the silica gel coating and in binding of the silica gel to the shale.

The triggering agent as referred to throughout this application can be selected from the group consisting of $CO_2$, an organic acid, an inorganic acid, an at least partially water soluble multi-valent metal salt, and combinations thereof. The $CO_2$ reacts with water in the subterranean formation to form carbonic acid which serves as the triggering agent. The inorganic acid can be selected from the group consisting of hydrochloric acid, sulfuric acid, hydrofluoric acid, and combinations thereof; and the organic acid can be selected from the group consisting of acetic acid, formic acid, citric acid, and combinations thereof.

The at least partially water soluble multi-valent metal salt as referred to throughout this application can be selected from the group consisting of calcium chloride, magnesium chloride, and combinations thereof.

It is generally disclosed that the shale stabilizer can be introduced to the subterranean formation either simultaneously with or prior to the introduction of the alkali silicate to the subterranean formation, and with and without the surfactant.

A method for stabilizing a subterranean formation can comprise, consist of, or consist essentially of:
a) introducing the aqueous solution as described herein into a subterranean formation, wherein the subterranean formation comprises shale and is fluidly coupled to a wellbore;
b) introducing the alkali silicate as described herein into the subterranean formation;
c) allowing the alkali silicate and the triggering agent to react to form a reaction product selected from the group consisting of a silicate gel, an insoluble silicate salt, and combinations thereof;
d) introducing a conditioning stream comprising water into the subterranean formation;
e) introducing a subsequent aqueous solution, comprising i) water, ii) a subsequent shale stabilizer, which can be the same as the shale stabilizer described herein, iii) a subsequent surfactant, which can be the same as the surfactant described herein, and iv) a subsequent triggering agent, which can be the same as the triggering agent described herein, into the subterranean formation;
f) introducing a subsequent alkali silicate, which can be the same as the alkali silicate described herein, into the subterranean formation;
g) allowing the subsequent alkali silicate and the subsequent triggering agent to react to form a subsequent reaction product selected from the group consisting of a silicate gel, an insoluble silicate salt, and combinations thereof.

The reaction product and the subsequent reaction product can each form a coating on the surface of at least a portion of the shale. Steps d)-g) can be repeated at least once or at least twice or at least three times.

The aqueous solution can be allowed to contact at least a portion of the shale in the subterranean formation for at least about 10 minutes and up to about 3 days or at least about 30 minutes and up to about 24 hours or at least about 1.5 hours and up to about 12 hours prior to introduction of the alkali silicate. The alkali silicate can be allowed to contact at least a portion of the shale in the subterranean formation for at least about 10 minutes and up to about 3 days or at least about 30 minutes and up to about 24 hours or at least about 1.5 hours and up to about 12 hours prior to introduction of the conditioning stream. The conditioning stream can be allowed to contact at least a portion of the shale in the subterranean formation for at least about 10 minutes and up to about 24 hours or at least about 10 minutes and up to about 12 hours or at least about 0.5 hours and up to about 3 hours prior to introduction of the subsequent aqueous solution. The subsequent aqueous solution can be allowed to contact at least a portion of the shale in the subterranean formation for at least about 10 minutes and up to about 12 hours or at least about 30 minutes and up to about 12 hours or at least about 1 hour and up to about 3 hours prior to introduction of the subsequent alkali silicate. The subsequent alkali silicate can be allowed to contact at least a portion of the shale in the subterranean formation for at least about 30 minutes and up to about 3 hours or at least about 30 minutes and up to about 12 hours or at least about 1 hour and up to about 3 hours prior to introduction of any subsequent conditioning stream.

The subterranean formation can be a coal bed methane formation comprising at least two coal bed seams and at least one shale inter-burden comprising shale located between the coal bed seams.

A method for treating a subterranean formation can comprise, consist of, or consist essentially of:
a) introducing a first stream comprising the shale stabilizer as described herein and a first surfactant into the subterranean formation, wherein the subterranean formation comprises shale and is fluidly coupled to a wellbore;
b) introducing a second stream comprising the alkali silicate as described herein and a second surfactant into the subterranean formation;
c) introducing a third stream comprising the triggering agent as described herein into the subterranean formation; and
d) allowing the alkali silicate and the triggering agent to react to form a reaction product selected from the group consisting of a silicate gel, an insoluble silicate salt, and combinations thereof.

The first stream and the third stream can be introduced to the subterranean formation prior to introduction of the second stream. In such case, the first and third streams can be allowed to contact at least a portion of the shale in the subterranean formation for at least about 10 minutes and up to about 3 days or at least about 30 minutes and up to about 24 hours or at least about 1.5 hours and up to about 12 hours prior to introduction of the second stream.

The first surfactant and the second surfactant can each separately be selected from the group consisting of nonionic surfactants, anionic surfactants, zwitterionic surfactants, and combinations thereof.

The first stream can be introduced prior to the introduction of the second stream, and the second stream can be introduced prior to the introduction of the third stream. The first stream can be allowed to contact at least a portion of the shale in the subterranean formation for at least about 10 minutes and up to about 3 days or at least about 30 minutes and up to about 24 hours or at least about 1.5 hours and up to about 12 hours prior to introduction of the second stream; and the second stream can be allowed to contact at least a portion of the shale in the subterranean formation for at least about 10 minutes and up to about 3 days or at least about 30 minutes and up to about 24 hours or at least about 1.5 hours and up to about 12 hours prior to introduction of the third stream.

EXAMPLES

Shale samples used in the following examples are core samples of shale obtained during drilling of a CBM formation. The produced water used in the following examples was prepared based on typical compositions of water produced from a CBM well. In particular, the prepared produced water had the following composition (shown in Table 1), wherein the listed salts were added to water, and the mg/L is based on the total weight of the prepared produced water:

TABLE 1

| Salt | mg/L |
| --- | --- |
| NaHCO$_3$ | 1624.6 |
| Na$_2$CO$_3$ | 56.5 |
| MgCl$_2$·6H$_2$O | 50.2 |
| CaCl$_2$·2H$_2$O | 150.4 |
| KCl | 19.1 |
| NaCl | 6397.7 |

Example 1

In this Example 1, a shale sample was exposed to produced water without any prior treatment of the shale. The physical state of the shale sample was inspected and photographed periodically. FIG. 1 includes photos taken at time 0 up to 72 hours, and as can be seen from the photos, the shale sample was extremely unstable in that it was fully disintegrated in the produced water within one hour.

Example 2

Figure 2:
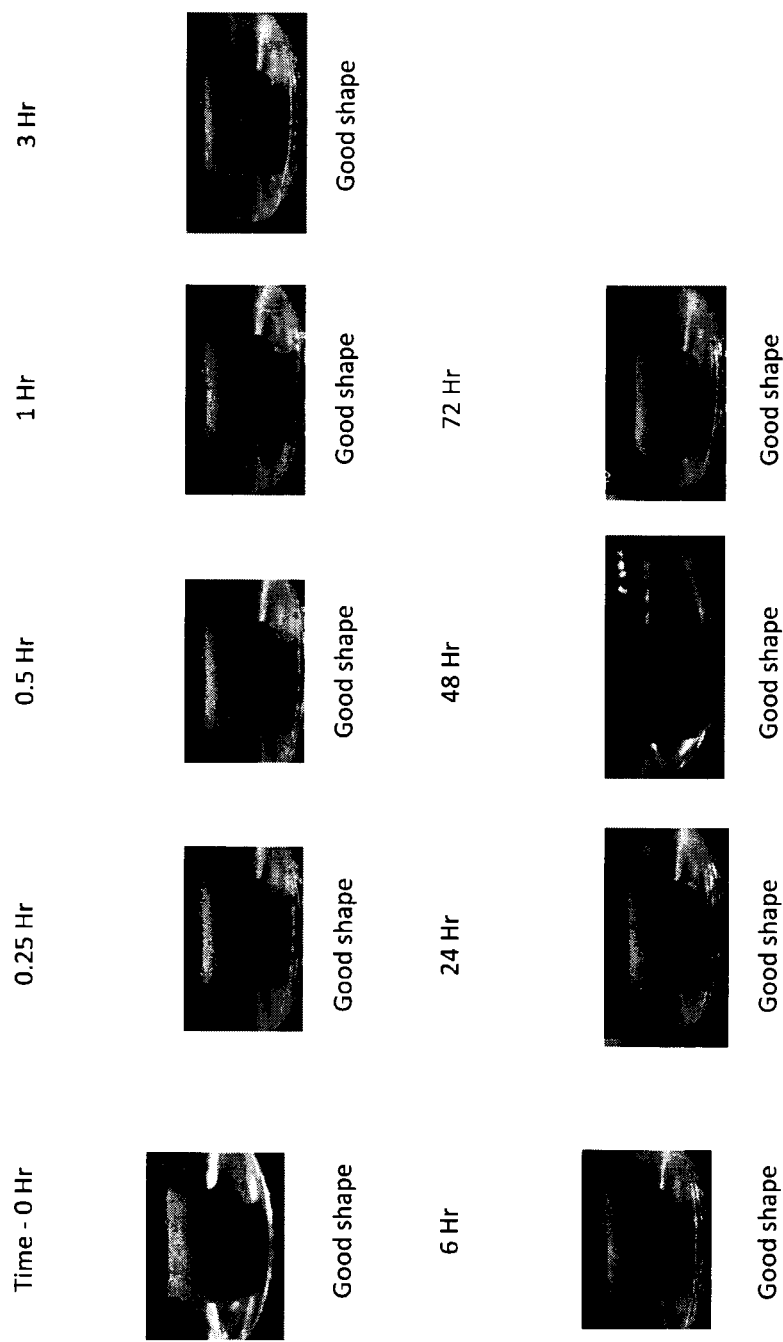
FIG. 2 depicts photographs of shale samples following various treatment exposures.

In this Example 2, a shale sample was exposed to an aqueous solution containing a mixture of shale stabilizers: 3 wt % polyethamine; 3 wt % KCl, 94 wt % water at room temperature and for 3 days. The physical state of the shale sample was inspected and photographed periodically. FIG. 2 includes photos taken at time 0 up to 72 hours, and as can be seen from the photos, the shale sample appeared to be stable for at least 72 hours.

Example 3

Figure 3:
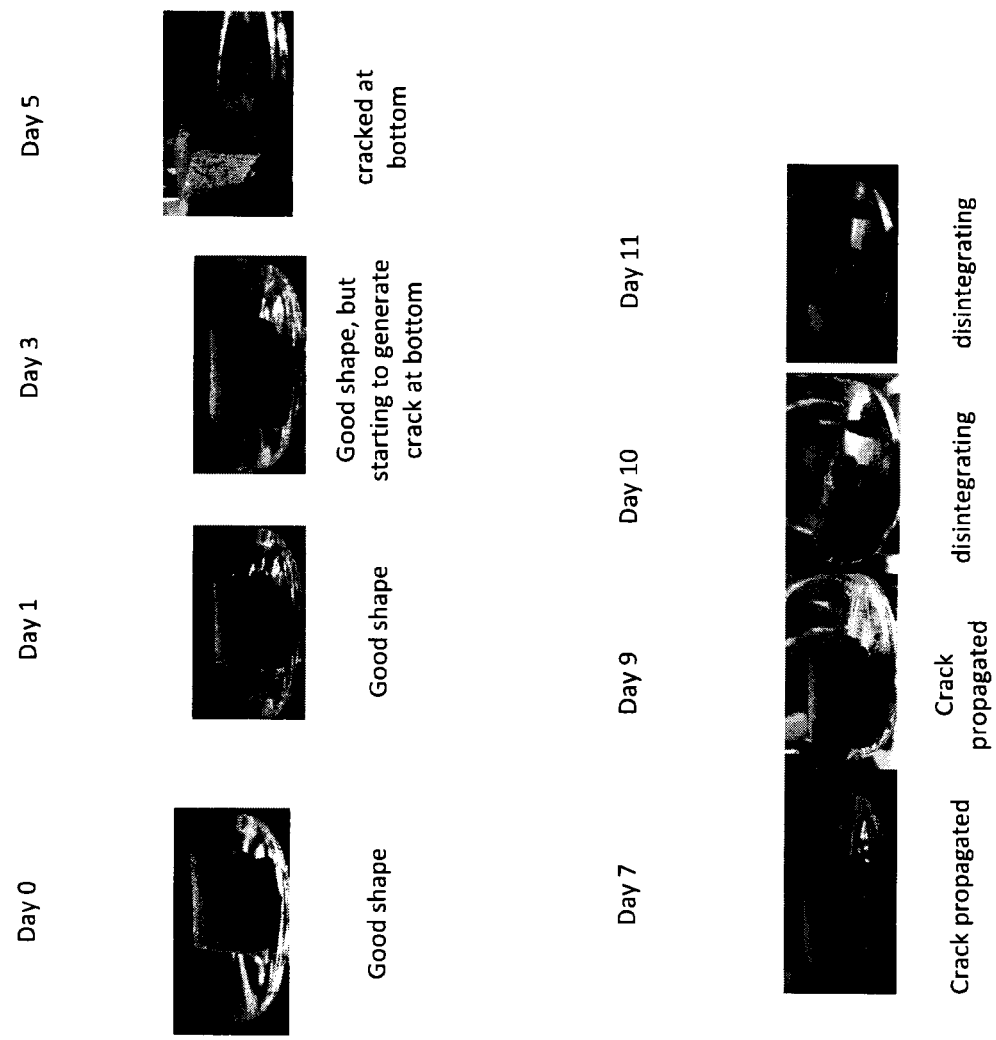
FIG. 3 depicts photographs of shale samples following various treatment exposures.

In this Example 3, the shale sample from Example 2, following its exposure to the aqueous solution containing the mixture of shale stabilizers, was exposed to produced water for an extended period of time to simulate actual downhole environments where shale would be exposed to produced water for extended periods. The physical state of the shale sample was inspected and photographed periodically. FIG. 3 includes photos taken at time 0 up to 11 days, and as can be seen from the photos, the shale sample disintegrated after 10 days of exposure to produced water following the shale stabilizer treatment.

Example 4

Figure 4:
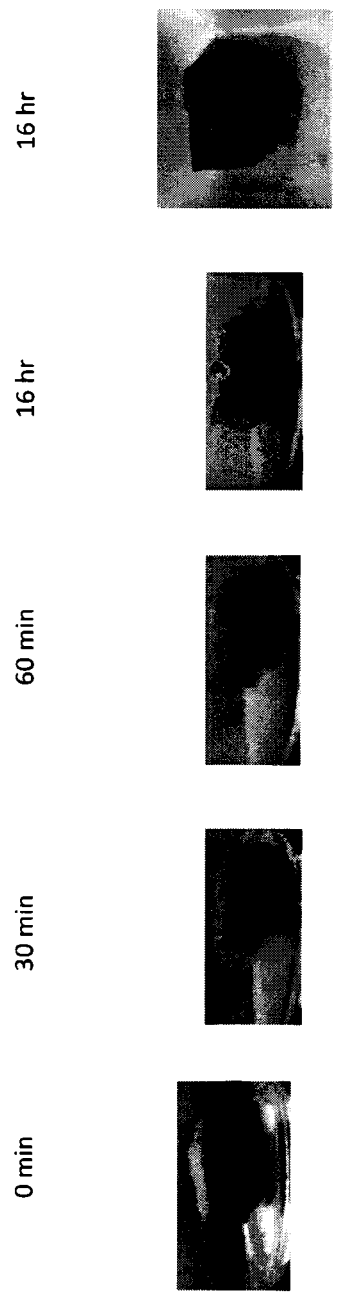
FIG. 4 depicts photographs of shale samples following various treatment exposures.

In this Example 4, a shale sample was first exposed to 50 ml of a first aqueous solution containing about 30 wt % sodium silicate and 70 wt % water for a period of 5 minutes. The shale sample was then exposed to 50 ml of glacial acetic acid for a period of 5 minutes. The shale sample was then exposed to a second aqueous solution containing 3 wt % KCl and 97 wt % water for an extended period of time. The physical state of the shale sample was inspected and photographed periodically. FIG. 4 includes photos taken at time 0 up to 16 hours, and as can be seen from the photos, a rather loose coating on the shale sample was visible.

Example 5

Figure 5:
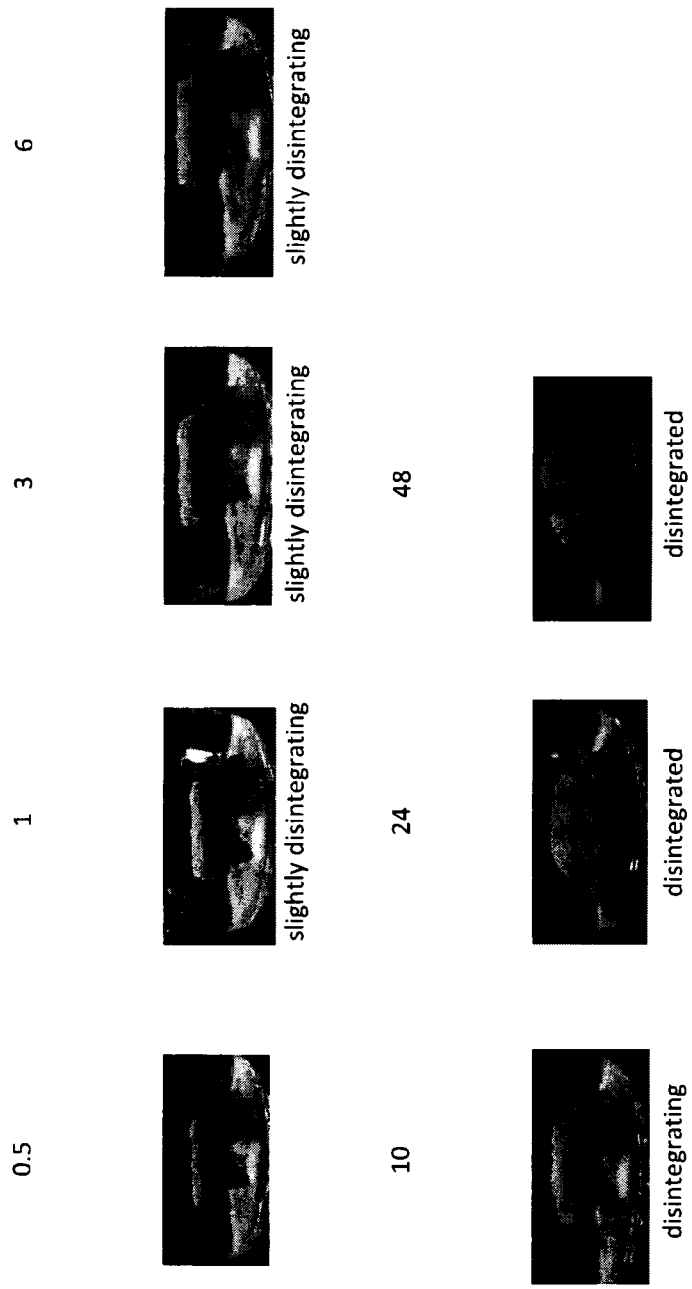
FIG. 5 depicts photographs of shale samples following various treatment exposures.

The shale sample following the exposures in Example 4 (at 16 hours) was then exposed to produced water for an extended period of time. The physical state of the shale sample was inspected and photographed periodically. FIG. 5 includes photos taken at time 0 up to 48 hours, and as can be seen from the photos, the coating formed on the shale sample did not provide long term stability. It is noted that the shale stabilizer was not present in the solution during the coating process, resulting in the lack of long term stability.

Example 6

Figure 6:
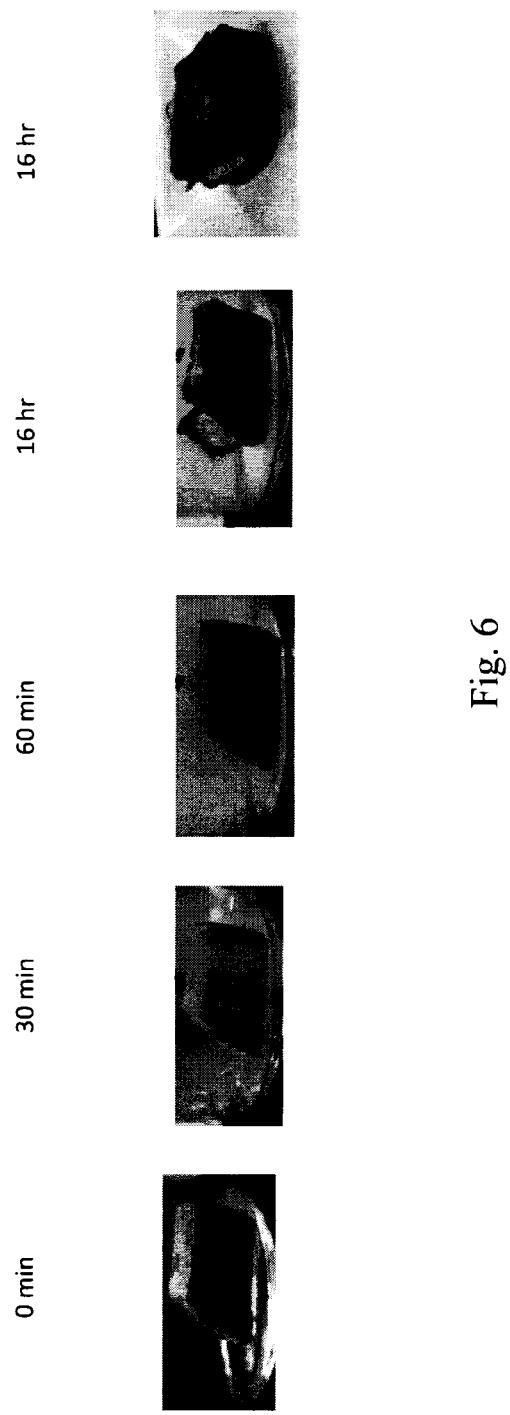
FIG. 6 depicts photographs of shale samples following various treatment exposures.

In this Example 6, a shale sample was first exposed to 50 ml of a first aqueous solution containing about 30 wt % sodium silicate and 70 wt % water for a period of 5 minutes. The shale sample was then exposed to a second aqueous solution containing 10 wt % CaCl$_2$ and 90 wt % water for an extended period of time. The physical state of the shale sample was inspected and photographed periodically. FIG. 6 includes photos taken at time 0 up to 16 hours, and as can be seen from the photos, a white coating on the shale sample was visible.

Example 7

Figure 7:
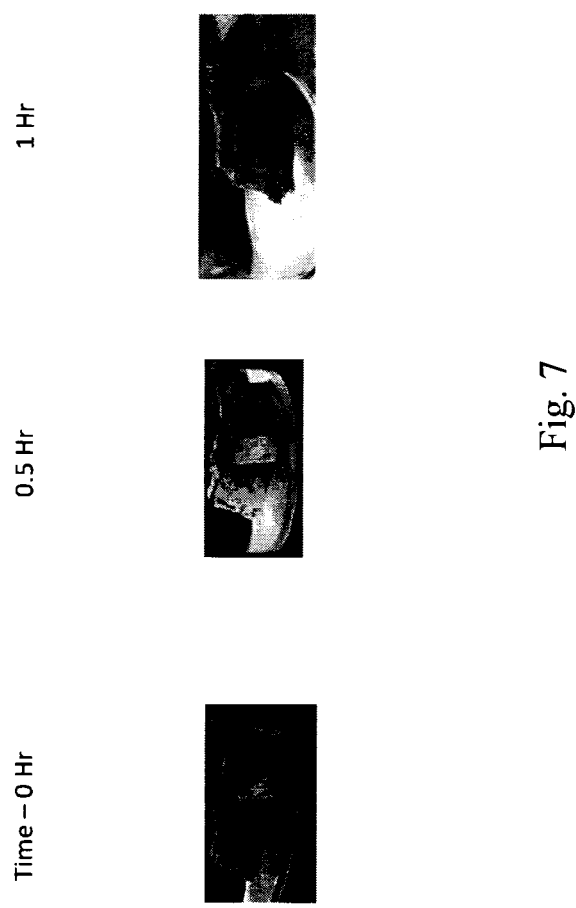
FIG. 7 depicts photographs of shale samples following various treatment exposures.

The shale sample following the exposures in Example 6 (at 16 hours) was then exposed to produced water for an extended period of time. The physical state of the shale sample was inspected and photographed periodically. FIG. 7 includes photos taken at time 0 up to 1 hour, and as can be seen from the photos, the coating formed on the shale sample did not provide long term stability. It is noted that the shale stabilizer was not present in the solution during the coating process, resulting in the lack of long term stability.

Example 8

Figure 8:
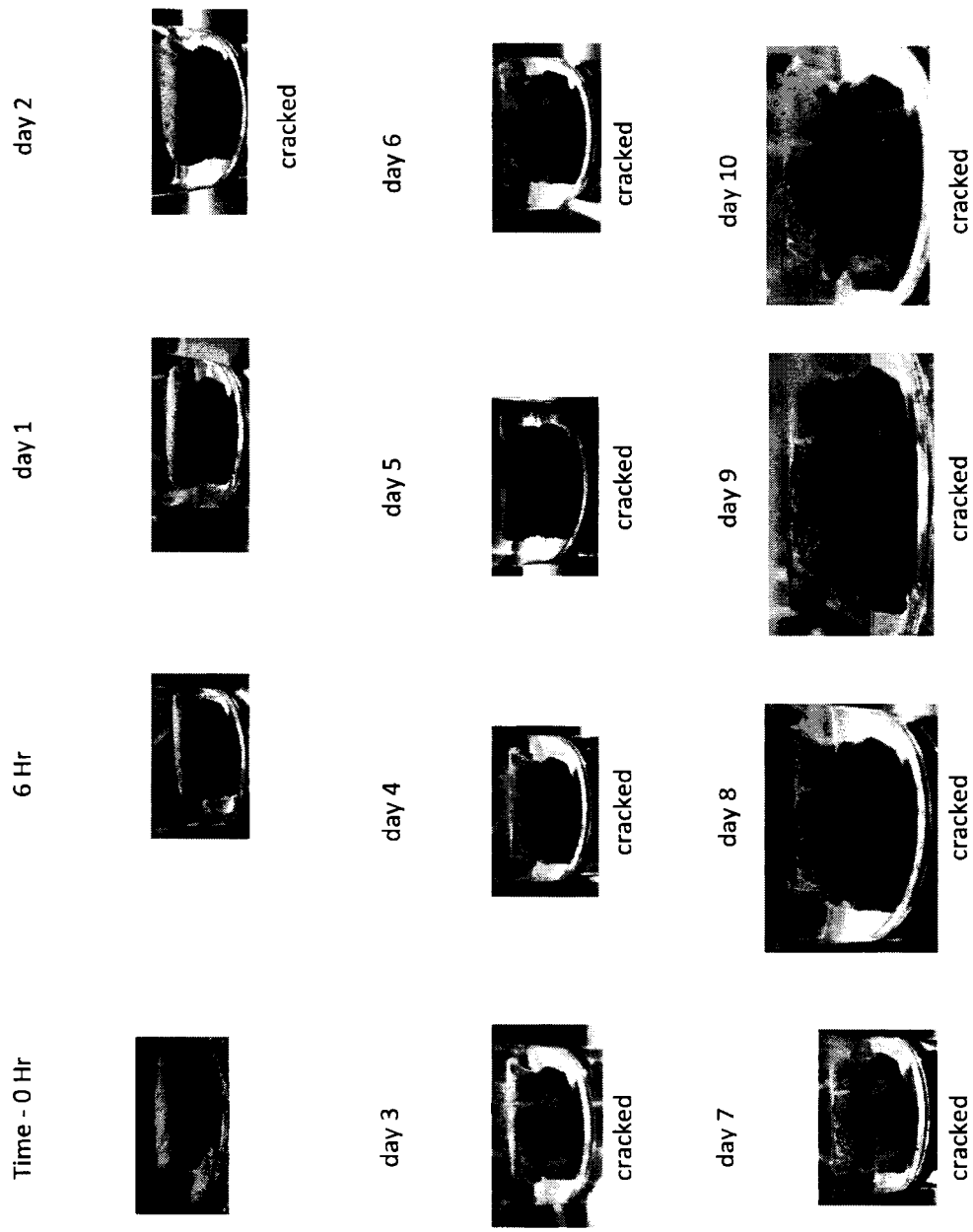
FIG. 8 depicts photographs of shale samples following various treatment exposures.

In this Example 8, a shale sample was first exposed to a first aqueous solution containing a mixture of shale stabilizers: 3 wt % polyethamine; 3 wt % KCl, 94 wt % water, at room temperature for 3 days. The shale sample was then exposed to a second aqueous solution containing about 22.5 wt % sodium silicate and 77.5 wt % water for a period of 16 hours. The shale sample was then exposed to a third aqueous solution containing 50 wt % acetic acid and 50 wt % water for a period of 30 minutes. The resulting shale sample was then exposed to produced water for an extended period of time. The physical state of the shale sample was inspected and photographed periodically. FIG. 8 includes photos taken at time 0 up to 10 days. As shown in FIG. 8, the shale sample experienced further enlargement of the initial cracks but stabilized after 5 days. It is noted that at day 10, besides the cracks, the main portion of the shale sample body remained intact. This is compared to the shale sample of Example 3, wherein, as shown in FIG. 3, the shale sample without the treatment with sodium silicate and the acetic acid disintegrated after 10 days of exposure to produced water.

Example 9

Figure 9:
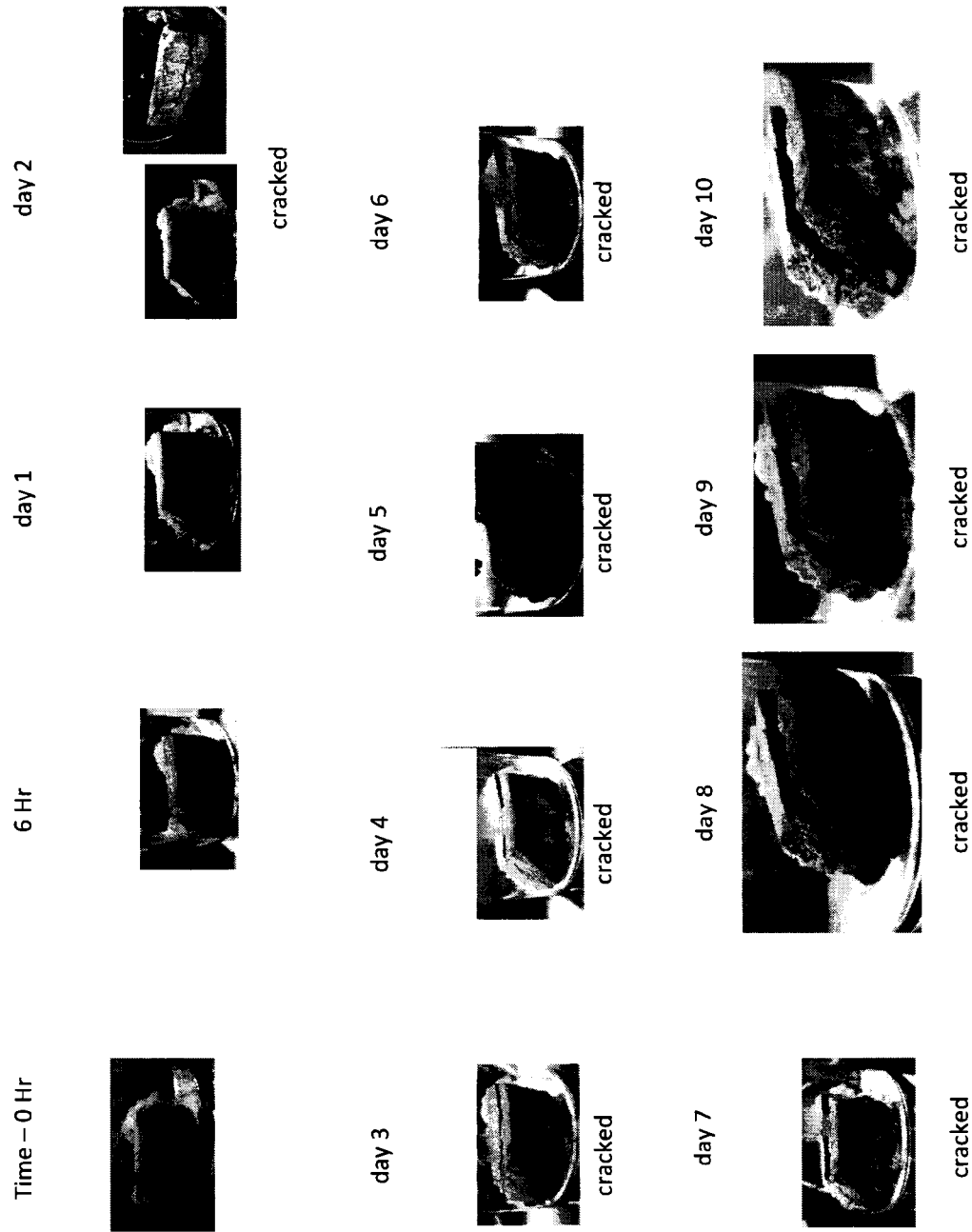
FIG. 9 depicts photographs of shale samples following various treatment exposures.

In this Example 9, a shale sample was first exposed to a first aqueous solution containing a mixture of shale stabilizers: 3 wt % polyethamine; 7 wt % KCl, 90 wt % water, at room temperature for 3 days. The shale sample was then exposed to a second aqueous solution containing about 28.5 wt % sodium silicate and 71.5 wt % water for a period of 16 hours. The shale sample was then exposed to a third aqueous solution containing 50 wt % acetic acid and 50 wt % water for a period of 30 minutes. The resulting shale sample was then exposed to produced water for an extended period of time. The physical state of the shale sample was inspected and photographed periodically. FIG. 9 includes photos taken at time 0 up to 10 days. As shown in FIG. 9, the shale sample experienced similar results to that of Example 8.

Example 10

In this Example 10, shale samples 10-1-10-8 were soaked first in various triggering solutions for 30 minutes followed by 30 minutes of soaking with different coating solutions, as shown in Table 2 below.

TABLE 2

| Shale Sample | Triggering Solution (in wt %, balance water) | Coating Solution (in wt %, balance water) |
|---|---|---|
| 10-1 | 7 wt % KCl<br>3 wt % polyetheramine<br>0.2 wt % Surfactant A*<br>7 wt % CaCl$_2$ | 7 wt % KCl<br>75 wt % K$_2$SiO$_3$<br>0.2 wt % Surfactant A* |
| 10-2 | 7 wt % KCl<br>3 wt % polyetheramine<br>0.2 wt % Surfactant A*<br>12 wt % CaCl$_2$ | 7 wt % KCl<br>75 wt % K$_2$SiO$_3$<br>0.2 wt % Surfactant A* |
| 10-3 | 7 wt % KCl<br>3 wt % polyetheramine<br>0.2 wt % Surfactant A*<br>7 wt % CaCl$_2$ | 7 wt % KCl<br>75 wt % Na$_2$SiO$_3$<br>0.2 wt % Surfactant A* |
| 10-4 | 7 wt % KCl<br>3 wt % polyetheramine<br>0.2 wt % Surfactant A*<br>12 wt % CaCl$_2$ | 7 wt % KCl<br>75 wt % Na$_2$SiO$_3$<br>0.2 wt % Surfactant A* |
| 10-5 | 7 wt % KCl<br>3 wt % polyetheramine<br>0.2 wt % Surfactant A*<br>7 wt % CaCl$_2$ | 10 wt % NaCO$_3$ |
| 10-6 | 7 wt % KCl<br>3 wt % polyetheramine<br>0.2 wt % Surfactant A*<br>7 wt % CaCl$_2$ | 10 wt % Na$_2$SO$_4$ |
| 10-7 | 7 wt % KCl<br>3 wt % polyetheramine | 7 wt % KCl<br>75 wt % K$_2$SiO$_3$ |

TABLE 2-continued

| Shale Sample | Triggering Solution (in wt %, balance water) | Coating Solution (in wt %, balance water) |
|---|---|---|
| 10-8 | 0.2 wt % Surfactant A*<br>7 wt % MgCl$_2$<br>7 wt % KCl<br>3 wt % polyetheramine<br>0.2 wt % Surfactant A*<br>7 wt % MgCl$_2$ | 0.2 wt % Surfactant A*<br>7 wt % KCl<br>75 wt % Na$_2$SiO$_3$<br>0.2 wt % Surfactant A* |

*Surfactant A: contains an oxyalkylated alcohol based nonionic surfactant

Figure 10:
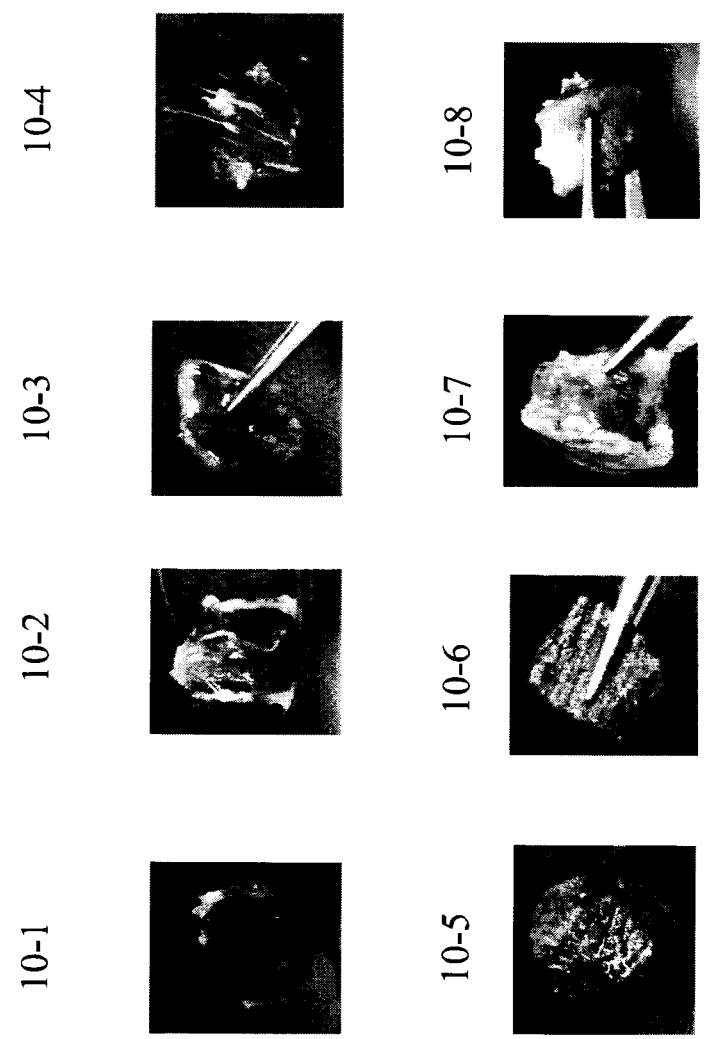
FIG. 10 depicts photographs of shale samples following various treatment exposures.
Figure 11:
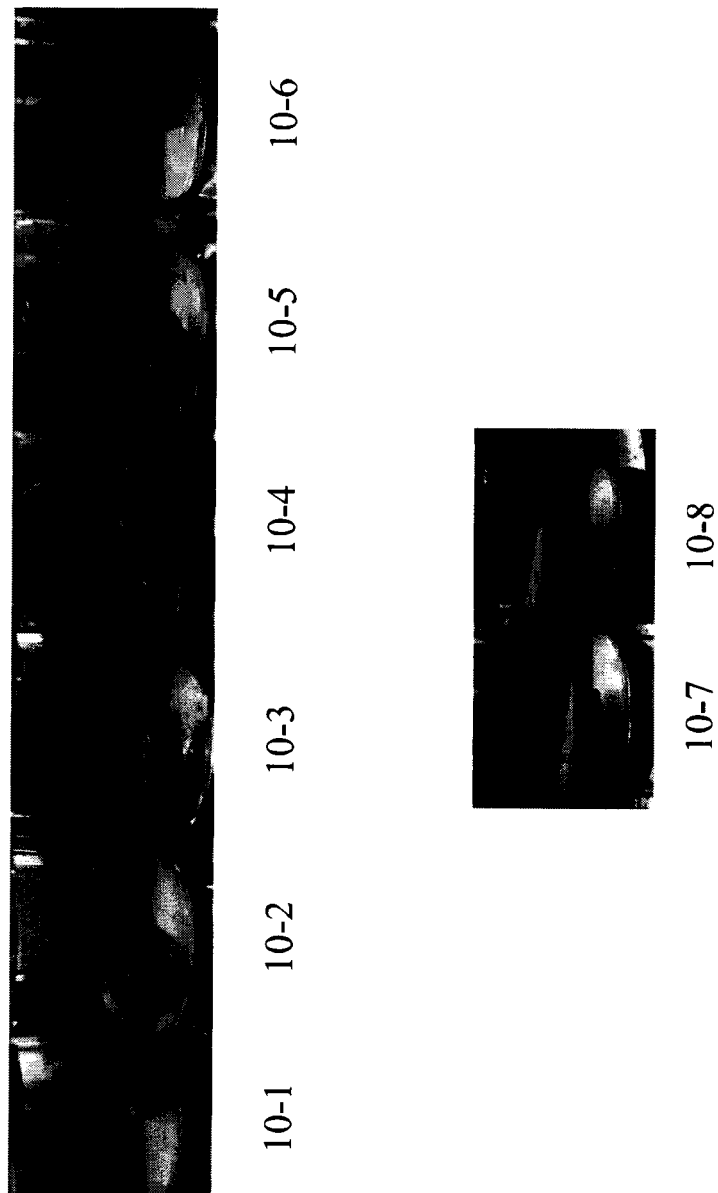
FIG. 11 depicts photographs of shale samples following various treatment exposures.
Figure 12:
FIG. 12 depicts photographs of shale samples following various treatment exposures.
Figure 12:

The soaking process was then repeated twice to allow formation of multiple coating layers. FIG. 10 includes photos of the shale samples following the third and final soaking, and indicate coating of the shale samples in most cases. The coated shale samples were then immersed in fresh water. The fresh water was changed out 3 times (to simulate continuous flow of fresh water). FIG. 11 includes photos of the shale samples following the $3^{rd}$ fresh water change-out, and shows that all shale samples remained intact. The shale samples were then allowed to soak in such fresh water overnight (for 12 hours). FIG. 12 includes photos of the shale samples after such overnight soaking, and shows that only shale samples 10-1 and 10-7 remained intact. This indicates that potassium silicate performs well as a coating agent, and coating performance is lower with higher calcium chloride concentration.

Example 11

In this Example 11, shale samples 11-1-11-4 were:
A) soaked first in various $1^{st}$ triggering solutions for 1 hour and 30 minutes;
B) followed by 1 hour and 30 minutes of soaking with different $1^{st}$ coating solutions;
C) followed by soaking in fresh water for 2 hours;
D) followed soaking in various $2^{nd}$ triggering solutions for 30 minutes; and
E) followed by 30 minutes of soaking with different $2^{nd}$ coating solutions.

The various triggering and coating solution compositions are set out in Table 3 below. The solutions in Table 3 are all in wt. %, with the balance being water.

TABLE 3

| Shale Sample | 11-1 | 11-2 | 11-3 | 11-4 |
|---|---|---|---|---|
| $1^{st}$ Triggering Solution | 7% KCl<br>3% polyetheramine<br>0.4% Surfactant A*<br>12% CaCl$_2$ | 7% KCl<br>3% polyetheramine<br>0.4% Surfactant A*<br>12% CaCl$_2$ | 7% KCl<br>0.4% Surfactant A*<br>12% CaCl$_2$ | 7% KCl<br>0.4% Surfactant A*<br>12% MgCl$_2$ |
| $1^{st}$ Coating Solution | 7% KCl<br>75% K$_2$SiO$_3$<br>0.4% Surfactant A* | 7% KCl<br>75% K$_2$SiO$_3$<br>0.4% Surfactant A* | 7% KCl<br>75% K$_2$SiO$_3$<br>0.4% Surfactant A* | 7% KCl<br>75% K$_2$SiO$_3$<br>0.4% Surfactant A* |
| $2^{nd}$ Triggering Solution | 7% KCl<br>3% polyetheramine<br>0.4% Surfactant A*<br>12% CaCl$_2$ | 7% KCl<br>0.4% Surfactant A*<br>12% CaCl$_2$ | 7% KCl<br>0.4% Surfactant A*<br>12% CaCl$_2$ | 7% KCl<br>0.4% Surfactant A*<br>12% MgCl$_2$ |
| $2^{nd}$ Coating Solution | 7% KCl<br>75% K$_2$SiO$_3$<br>0.4% Surfactant A* | 7% KCl<br>75% K$_2$SiO$_3$<br>0.4% Surfactant A* | 7% KCl<br>75% K$_2$SiO$_3$<br>0.4% Surfactant A* | 7% KCl<br>75% K$_2$SiO$_3$<br>0.4% Surfactant A* |

*Surfactant A: contains an oxyalkylated alcohol based nonionic surfactant

Figure 13:
FIG. 13 depicts photographs of shale samples following various treatment exposures.
Figure 14:
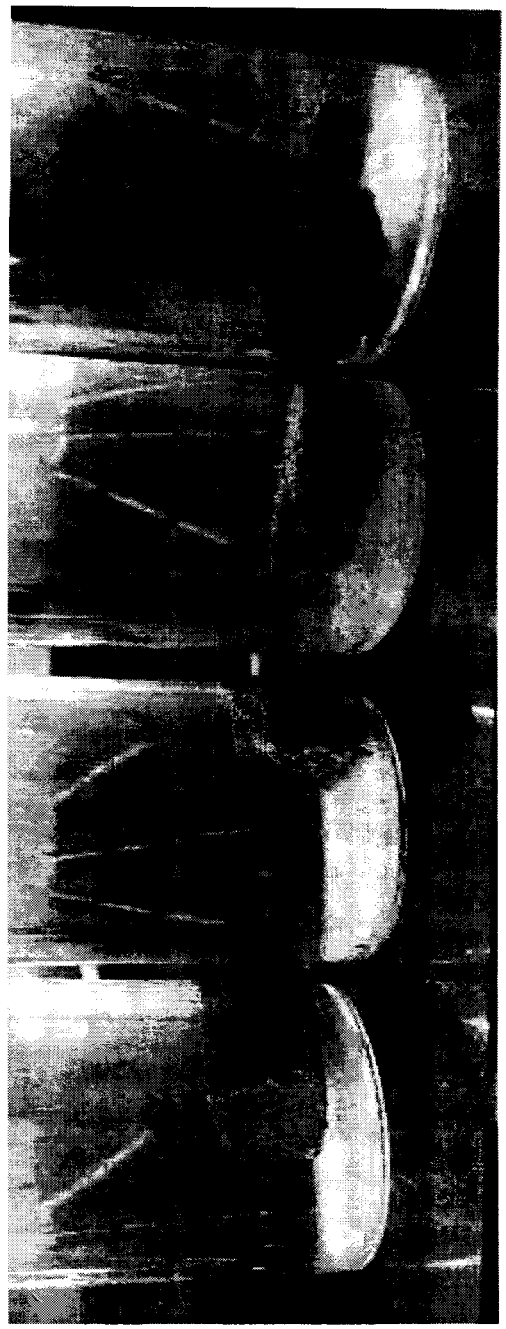
FIG. 14 depicts photographs of shale samples following various treatment exposures.

FIG. 13 includes photos of the shale samples 11-1-11-4 after 64 hours of soaking in fresh water following the $1^{st}$ Coating Solution soaking, and indicate shale sample stability for each of the shale samples 11-1-11-4. During such 64 hour period, the fresh water was changed out once for each of the shale samples 11-1-11-4 (to simulate continuous flow of fresh water). FIG. 14 includes photos of the shale samples 11-1-11-4 after 189 hours of soaking in fresh water following the $2^{nd}$ Coating Solution soaking, and indicate continued shale sample stability for each of the shale samples 11-1-11-4. During such 189 hour period, the fresh water was changed out fourteen times for each of the shale samples 11-1-11-4 (to simulate continuous flow of fresh water).

As is evident from the figures and text presented above, a variety of embodiments according to the present disclosure are contemplated.

While the disclosure has provided specific and detailed descriptions to various embodiments, the same is to be considered as illustrative and not restrictive in character. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

Moreover, in reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. It is the express intention of the applicant not to invoke 35 U.S.C. § 112, paragraph 6 for any limitations of any of the claims herein, except for those in which the claim expressly uses the words 'means for' together with an associated function.

That which is claimed:

1. A method, comprising:
   a) introducing an aqueous solution comprising i) water, ii) a shale stabilizer, iii) a surfactant, and iv) a triggering agent into a coalbed methane (CBM) well, wherein the-well comprises shale;
   b) introducing an alkali silicate into the well; and
   c) allowing the alkali silicate and the triggering agent to react to form a reaction product selected from the group consisting of a silicate gel, an insoluble silicate salt, and combinations thereof.

2. The method of claim 1, wherein the alkali silicate is selected from the group consisting of sodium silicate, potassium silicate, and combinations thereof.

3. The method of claim 1, wherein the shale stabilizer is selected from the group consisting of a polyether amine, a polyether amine salt, potassium chloride, choline chloride, tetramethylammonium chloride, and combinations thereof; and wherein the surfactant is selected from the group consisting of nonionic surfactants, anionic surfactants, zwitterionic surfactants, and combinations thereof.

4. The method of claim 1, wherein the triggering agent is selected from the group consisting of $CO_2$, an organic acid, an inorganic acid, an at least partially water soluble multi-valent metal salt, and combinations thereof.

5. The method of claim 4, wherein the inorganic acid is selected from the group consisting of hydrochloric acid, sulfuric acid, hydrofluoric acid, and combinations thereof; and wherein the organic acid is selected from the group consisting of acetic acid, formic acid, citric acid, and combinations thereof.

6. The method of claim 4, wherein the CO2 reacts with water in the well to form carbonic acid.

7. The method of claim 4, wherein the at least partially water soluble multi-valent metal salt is selected from the group consisting of calcium chloride, magnesium chloride, and combinations thereof.

8. The method of claim 1, wherein the aqueous solution is allowed to contact at least a portion of the shale for at least about 10 minutes and up to about 3 days prior to introduction of the alkali silicate.

9. The method of claim 1, wherein the reaction product forms a coating on a surface of at least a portion of the shale.

10. The method of claim 9, wherein the coal bed methane well comprises at least two coal bed seams and at least one shale inter-burden comprising shale located between the coal bed seams.

11. A method, comprising:
    a) introducing an aqueous solution comprising i) water, ii) a shale stabilizer, iii) a surfactant, and iv) a triggering agent into a coal bed methane formation comprising shale and is fluidly coupled to a wellbore;
    b) introducing an alkali silicate into the formation;
    c) allowing the alkali silicate and the triggering agent to react to form a reaction product selected from the group consisting of a silicate gel, an insoluble silicate salt, and combinations thereof;
    d) introducing a conditioning stream comprising water into the formation;
    e) introducing a subsequent aqueous solution comprising i) water, ii) a subsequent shale stabilizer, iii) a subsequent surfactant, and iv) a subsequent triggering agent into the formation;
    f) introducing a subsequent alkali silicate into the formation; and
    g) allowing the subsequent alkali silicate and the subsequent triggering agent to react to form a subsequent reaction product selected from the group consisting of a silicate gel, an insoluble silicate salt, and combinations thereof.

12. The method of claim 11, wherein steps d)-g) are repeated at least once.

13. The method of claim 11, wherein the alkali silicate and subsequent alkali silicate are each separately selected from the group consisting of sodium silicate, potassium silicate, and combinations thereof.

14. The method of claim 11, wherein the shale stabilizer and subsequent shale stabilizer are each separately selected from the group consisting of a polyether amine, a polyether amine salt, potassium chloride, choline chloride, tetramethylammonium chloride, and combinations thereof; and wherein the surfactant and subsequent surfactant are each separately selected from the group consisting of: nonionic surfactants, anionic surfactants, zwitterionic surfactants, and combinations thereof.

15. The method of claim 11, wherein the triggering agent and subsequent triggering agent are each separately selected from the group consisting of $CO_2$, an organic acid, an inorganic acid, an at least partially water soluble multi-valent metal salt, and combinations thereof.

16. The method of claim 11, wherein the reaction product and the subsequent reaction product each form a coating on a surface of at least a portion of the shale.

17. A method comprising:
a) introducing a first stream comprising a shale stabilizer and a first surfactant into a subterranean coal bed methane formation, wherein the subterranean formation comprises shale and is fluidly coupled to a wellbore;
b) introducing a second stream comprising an alkali silicate and a second surfactant into the subterranean formation;
c) introducing a third stream comprising a triggering agent into the subterranean formation; and
d) allowing the alkali silicate and the triggering agent to react to form a reaction product selected from the group consisting of a silicate gel, an insoluble silicate salt, and combinations thereof.

18. The method of claim 17, wherein the first stream is introduced prior to the introduction of the second stream, and wherein the second stream is introduced prior to the introduction of the third stream.

19. The method of claim 18, wherein the first stream is allowed to contact at least a portion of the shale in the subterranean formation for at least about 10 minutes and up to about 3 days prior to introduction of the second stream.

20. The method of claim 18, wherein the second stream is allowed to contact at least a portion of the shale in the subterranean formation for at least about 10 minutes and up to about 3 days prior to introduction of the third stream.

\* \* \* \* \*